Inventor:
Albert S. Howell
By Miehle + Miehle
Attys.

Patented Jan. 3, 1933

1,893,327

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

PHOTOGRAPHIC CAMERA

Application filed December 11, 1929. Serial No. 413,160.

My invention relates to a lens turret construction of a photographic camera whereby a number of lenses may be selectively brought into operative position.

Certain objects of the invention reside in the provision of a lens turret construction which is compact, simple and effective, and which is particularly adapted to the construction of a certain motion picture camera of the field or outdoor type without necessitating radical change in the construction thereof.

The above objects and certain other objects, hereinafter appearing, are embodied in the preferred form of my invention, hereinafter fully described and illustrated in the accompanying drawings, and are effected by certain novel constructions, combinations and arrangements of parts particularly pointed out in the appended claims.

In the said drawings—

Figure 5 is an enlarged partial section substantially on the line 5—5 of Figure 2; and Figure 6 is a similar view showing the parts in different positions.

Like characters of reference indicate like parts in the several views.

Figure 1:
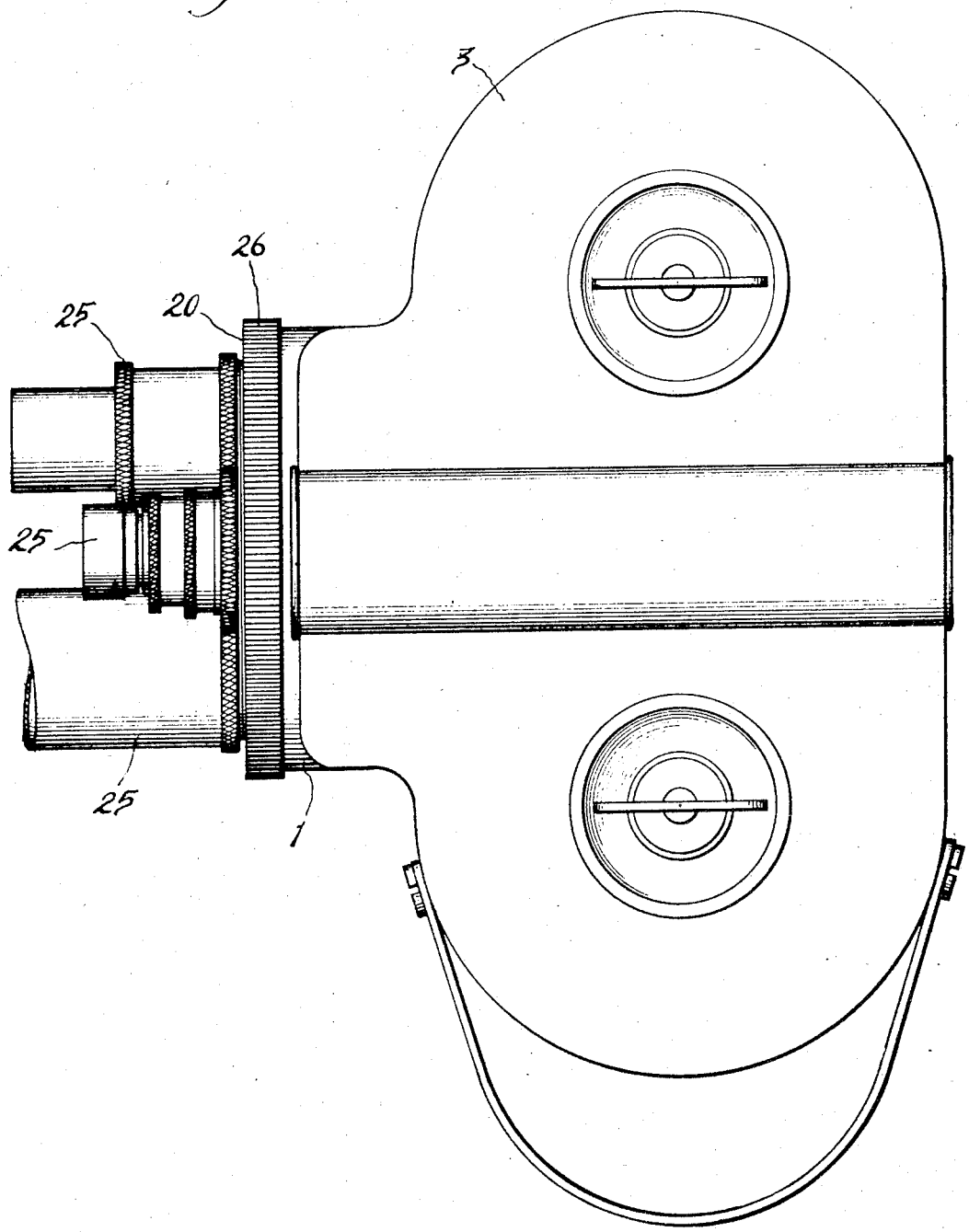
Figure 1 is a side elevation of a motion picture camera of the above mentioned type and embodying my invention.
Figure 2:
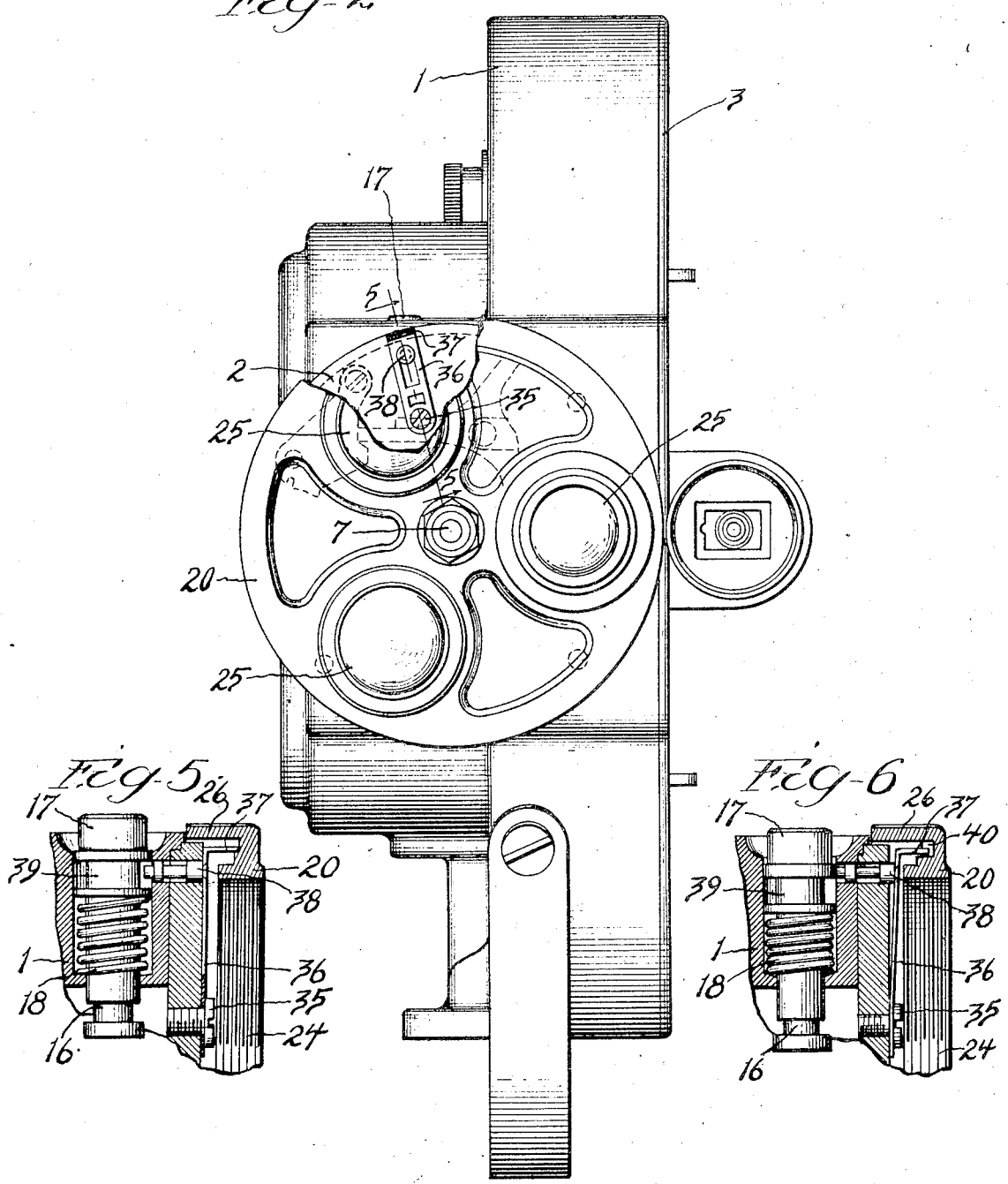
Figure 2 is a front elevation of the same with a part broken away.

Referring to the drawings, 1 designates generally a motion picture camera casing provided with a circular front opening in which is detachably secured, in a usual manner, a circular front piece 2, and with a side opening which is closed by a door or cover 3. See Figures 1 and 2.

Figure 3:
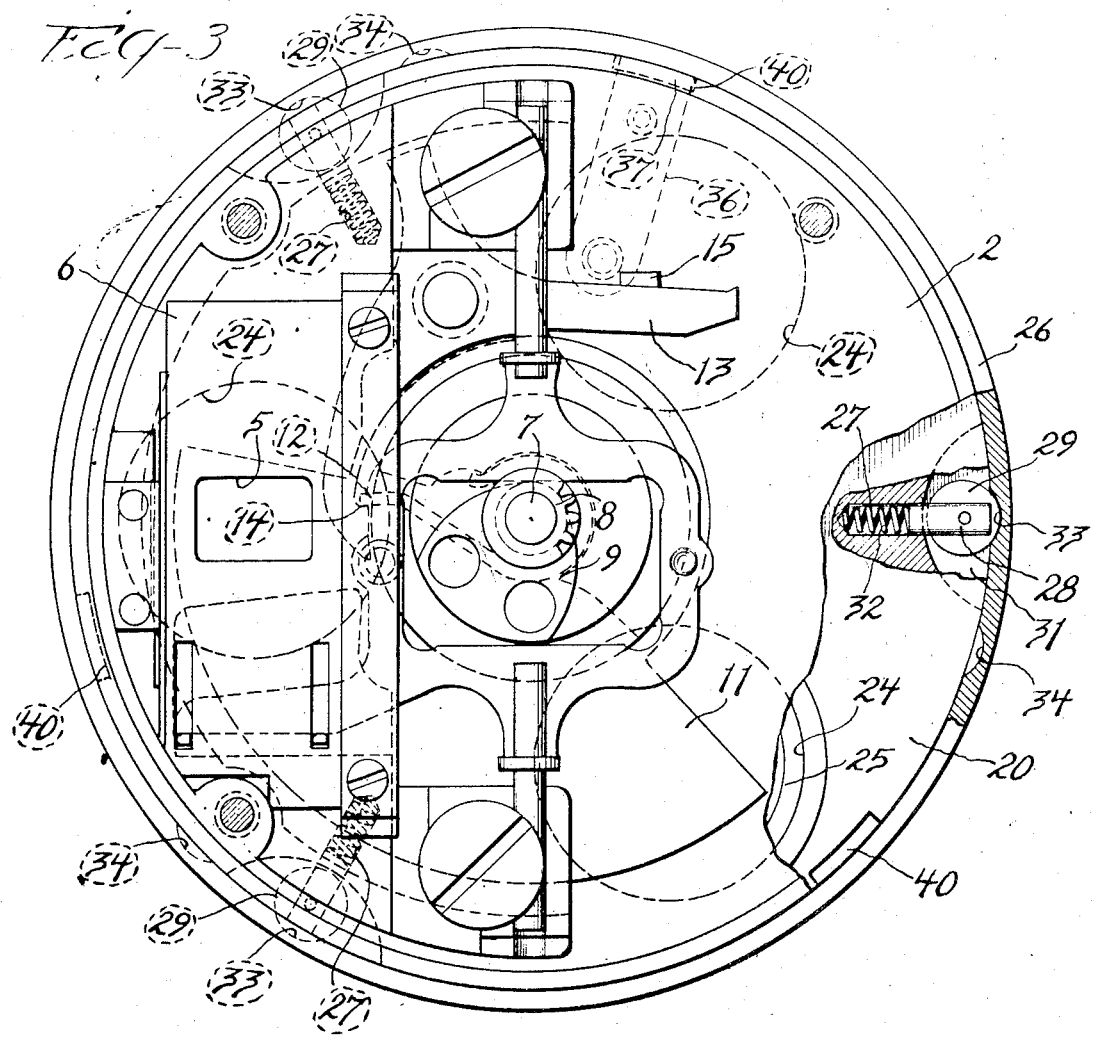
Figure 3 is an enlarged rear elevation of the front portion of the camera.
Figure 4:
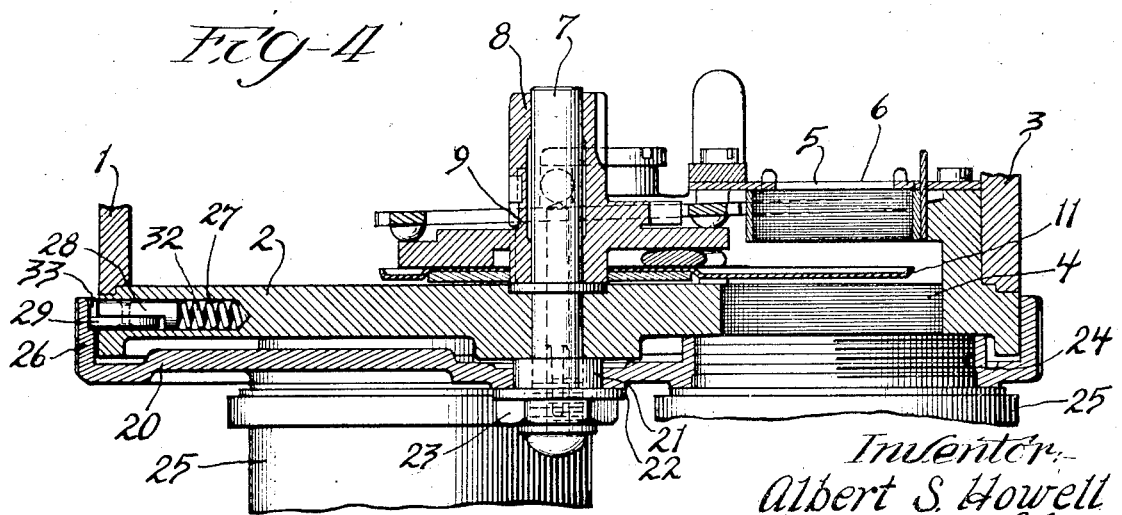
Figure 4 is a horizontal axial section of the aforesaid front portion of the camera.

The front piece 2 is provided adjacent the door 3 with a light opening 4 which is alined with an exposure aperture 5 in a front face with an intermittent film feed guide plate 6 of an intermittent film feed guide within the camera. See Figures 3 and 4.

The axis of the light opening 4 is disposed on the horizontal plane of the axis of the front piece 2 and in parallelism therewith, and disposed on the axis of the front piece and extending through and secured in an axial bore of the front piece is a stud 7 which extends rearwardly within the camera casing. Revolubly mounted on the rearwardly projecting portion of this stud and within the camera, is a bored hub member 8 which is driven from the camera driving mechanism.

Carried within the camera on the hub member 8 for rotation therewith is an intermittent feed cam formation 9, forming a part of the intermittent feed mechanism for intermittently feeding a film through the intermittent feed guide including the guide plate 6, and a revolving light shutter 11 within the camera is secured on the hub 8 and is timed to interrupt the passage of light to the exposure aperture 5 during the intermittent feeding of the film in the intermittent feed guide.

The camera mechanism including the hub member is driven, in a manner unnecessary to be described, by a spring motor, not shown, within the camera, and operation of the camera mechanism is controlled in the following manner. See Figures 3, 5 and 6.

The hub member 8 is provided with a stop formation 12, and an intermediately pivoted lever 13 within the camera has an end 14 thereof movable into and out of a position to engage the stop formation 12 for stopping operation of the camera. See Figure 3.

The other end of the lever 13 is provided with a rearwardly projecting lug 15 which is engaged in a circumferential groove 16 adjacent the lower end of a longitudinally movable plunger 17 engaged in a vertical bore of the casing 1. See Figures 5 and 6.

A helical compression spring 18 encircles the plunger 17, and reacting on the casing yieldably urges the plunger 17 upwardly, in which position the lever 13, operatively connected to the plunger by the lug 15 engaged in the groove 16, has the end 14 thereof engaged with the stop formation 12 to stop operation of the camera mechanism. See Figures 3 and 5.

The upper end of the plunger 17 is accessible exteriorly of the casing 1 for downward manual actuation against the influence of the spring 18 to release the end 14 of the lever 13 from the stop formation 12 for actuation of the camera mechanism.

The hereinbefore mentioned stud 7 also projects forwardly from the front piece 2, and a circular lens turret 20 is disposed in front of and is axially mounted on the forwardly projecting portion of the stud for angular movement by means of a collar 21 on the stud, a washer 22 on the stud in front of the collar and a nut 23 screwthreaded on the stud and clamping the collar and washer between it and the front piece. See Figures 2 and 4.

The turret 20 is provided with angularly and equally spaced lens openings 24 in which are mounted photographic lenses 25, and these lenses may, in the angular movement of the turret, be selectively brought into operative position in registry with the light opening 4 and exposure aperture 5 for photographically exposing a film in the guide of which the face guide plate 6 forms a part.

The turret 20 is provided with a cylindrical or peripheral rearwardly projecting flange 26 which advantageously surrounds the front piece 2 and by means of which the turret may be conveniently grasped for manipulation thereof. See particularly Figures 3 and 4.

Associated with the flange 26 is means for predeterminately locating the turret with reference to the camera whereby to predeterminately locate the lenses 25, on the turret, in operative or photographing position, which means will now be described. See Figures 3 and 4.

Angularly spaced equally about the front piece 2 are radial bores 27 extending inwardly from the periphery thereof, and slidably mounted in these bores are plungers 28. Rollers 29 are rotatably mounted on the plungers 28 and are engaged in slots 31 in the periphery of the front piece to prevent the rollers and plungers from angular movement on the axes of the plungers.

The rollers 29 are engageable outwardly against the inner surface of the flange 26 and are disposed to have a rolling contact therewith with angular movement of the turret, and helical compression springs 32 are disposed in the bores 27 between the inner ends thereof and the inner ends of the plungers 28 and yieldably urge the plungers and rollers 29 outwardly to maintain engagement between the rollers and the inner surface of the flange 26.

This inner surface of the flange 26 is provided with recesses 33 angularly spaced thereabout in correspondence with the bores 27 into which the rollers 29, urged by the springs 32, engage when the turret is positioned with a lens 25 in operative position whereby to predeterminately locate and maintain against accidental displacement a lens in operative position. The rollers 29 cam out of engagement with the recesses 33 for interchanging the lenses 25 with reference to operative or photographing position.

Thus it will be observed that the flange 26 is utilized for predeterminately locating the turret 20 with reference to the camera and that the radial pressure of the springs 33 is balanced by reason of their being angularly spaced about the axis of the turret.

The turret 20 may be positioned with all of the lenses 25 out of operative or photographing position by means of a second plurality of recesses 34 in the inner surface of the flange 26 and spaced from the recesses 33 and spaced correspondingly with the bores 27 and into which the rollers 29 engage when the turret is in a position where none of the lenses 25 are in operative or photographing position. See Figure 3.

In order to prevent operation of the camera when none of the lenses 25 are in operative position, say when the turret 20 is positioned with the rollers 29 engaged in the recesses 34, the following is provided.

Secured at one end, by means of a headed screw 35, on the front face of the front piece 2, is a spring member 36. See Figures 2, 5 and 6. The outer or free end of the spring member 36 is angled forwardly, as designated at 37, and this portion 37 is spring pressed against the rear face of the turret 20.

A stud 38 is secured to the spring member 36 adjacent the outer end of the spring member and projects rearwardly therefrom in a bore through the front piece 2 and casing 1 for engagement in a circumferential groove 39 on the control plunger 17 when this plunger is in its upper position, determined by the lug 15 engaging upwardly against the casing 1, to prevent downward movement of the control plunger and thereby to prevent operation of the camera mechanism.

When the end 37 of the spring member 36 is engaged with the normal rear surface of the turret 20, as shown in Figure 5, the control plunger 17 is locked in its upper position, as above described, to prevent operation of the camera mechanism.

The rear face of the turret 20 is provided with a plurality of recesses 40, spaced angularly about the axis thereof in correspondence with the recesses 33 and into one of which the outer end 37 of the spring member 36 is adapted to engage under the influence of the spring member when the rollers 29 are engaged in the recesses 33, that is when the turret is located with a lens 25 in operative position as heretofore described.

When the end 37 of the spring member 36 engages in a recess 40 the free portion of the spring member 36 of its own accord moves forwardly and withdraws the stud 38 from engagement with the groove 39 of the control plunger 17, whereupon the control plunger is free to be manually actuated downwardly for effecting operation of the camera mechanism. See Figure 6.

The arrangement is such that the end 37 of the spring member 36 cams out of the recesses 40 in the angular movement of the turret 20.

Thus, when the turret 20 is located with a lens 25 inoperative position the control plunger 17 may be actuated downwardly to effect operation of the camera mechanism, and when the turret is located with all of the lenses 25 out of operative position, say when the turret is located with the rollers 29 engaged in the recesses 34, the control plunger cannot be actuated to effect operation of the camera mechanism.

Consequently, when not using the camera the user can locate the turret with the rollers 29 engaged in the recesses 34 in order that the camera mechanism cannot be operated with resulting waste of film by mere depression of the control plunger 17.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:

I claim:—

1. In a photographic camera provided with an interior revolving light shutter, the combination of a stud mounted on the camera and projecting interiorly thereof for carrying said shutter for rotation and projecting exteriorly of the camera, and a lens carrier carried for angular movement on the exteriorly projecting portion of said stud.

2. In a photographic camera provided with an interior revolving light shutter, the combination of a stud mounted on the camera and projecting interiorly thereof for carrying said shutter for rotation and projecting exteriorly of the camera, a lens carrier carried for angular movement on the exteriorly projecting portion of said stud, and an axially projecting flange on said carrier and overlying a portion of the camera.

3. In a photographic camera provided with an interior revolving light shutter and a circular front portion, the combination of a stud mounted centrally on said front portion and projecting rearwardly thereof for carrying said shutter for rotation and also projecting forwardly of said front portion, a circular lens carrier in front of said front portion and mounted axially on said stud for angular movement, and a rearwardly projecting peripheral flange on said carrier and surrounding said front portion.

4. In a photographic camera provided with a circular detachable front piece and an interior revolving light shutter, the combination of a stud mounted centrally on said front piece and projecting rearwardly thereof for carrying said shutter for rotation and also projecting forwardly of said front piece, a circular lens carrier in front of said front piece and mounted axially on the forwardly projecting portion of said stud for angular movement, a rearwardly projecting peripheral flange on said carrier and surrounding said front piece, and means on said front piece and associated with said flange for predeterminately locating said carrier in its said movement with reference to the camera.

5. In a photographic camera provided with a manual camera operation control device, the combination of a lens carrier on the camera and movable for selectively positioning lenses, carried thereby, in operative position, and means under the control of said lens carrier and operative upon said control device for preventing operation of the camera and adapted to permit operation of the camera when a lens carried by said carrier is in operative position.

6. In a photographic camera the combination of a lens carrier on the camera and movable for selectively positioning lenses, carried thereby, in operative position, and means including a member for preventing operation of the camera and spring pressed against said carrier and engageable in recesses in said carrier for permitting operation of the camera when any of the lenses carried by said carrier is in operative position.

7. In a photographic camera provided with a camera operation control member spring pressed into position to prevent operation of the camera and manually actuated out of said position to permit operation of the camera, the combination of a lens carrier on the camera and movable for selectively positioning lenses, carried thereby, in operative position, and means under the control of said lens carrier for preventing actuation of said control member out of said position and adapted to permit actuation of said control member out of said position when a lens carried by said carrier is in operative position.

8. In a photographic camera provided with a camera operation control member spring pressed into position to prevent operation of the camera and manually actuated out of said position to permit operation of the camera, the combination with a lens carrier on the camera and movable for selectively positioning lenses, carried thereby, in operative position, and a member for preventing actuation of said control member out of said position and spring pressed against said carrier and engageable in recesses in said carrier for permitting actuation of said control member when any of the lenses carried by said carrier is in operative position.

9. In a photographic camera provided with a circular front portion and a camera operation control member spring pressed into position to prevent operation of the camera and manually actuated out of said position to permit operation of the camera, the combination of a circular lens carrier in front of said front portion and mounted coaxially therewith for angular movement on its axis, a rearwardly projecting peripheral flange on said carrier and surrounding said front portion, means associated with said flange for predeterminately locating said carrier in its movement with reference to the camera, and means under the control of said lens carrier for preventing actuation of said control member out of said position and adapted to permit actuation of said control member out of said position when a lens carried by said carrier is in operative position.

10. In a photographic camera the combination with film feeding means, of a lens carrier on the camera and movable for selectively positioning lenses, carried thereby, in operative position, and means under the control of said lens carrier for preventing operation of said feeding means and adapted to permit operation of said feeding means when a lens carried by said carrier is in operative position.

In witness whereof I hereunto affix my signature this 2nd day of December, 1929.

ALBERT S. HOWELL.